United States Patent [19]

Hartness

[11] Patent Number: 4,603,770

[45] Date of Patent: Aug. 5, 1986

[54] RAKE CONVEYOR APPARATUS

[76] Inventor: Thomas S. Hartness, Rte. 12, Paris Mountain, Greenville, S.C. 29609

[21] Appl. No.: 571,678

[22] Filed: Jan. 18, 1984

[51] Int. Cl.$^4$ .............................................. B65G 25/10
[52] U.S. Cl. .................................. 198/345; 198/745; 198/772
[58] Field of Search .................. 53/250; 198/345, 736, 198/737, 738, 739, 741, 742, 743–746, 749, 772

[56] References Cited

U.S. PATENT DOCUMENTS

| | | | |
|---|---|---|---|
| 2,820,542 | 1/1958 | Oswald | 198/772 |
| 2,964,159 | 12/1960 | Boyer, Sr. et al. | 198/745 |
| 3,165,198 | 1/1965 | Kay et al. | 198/745 |
| 3,184,044 | 5/1965 | Allen et al. | 198/746 |
| 3,499,524 | 3/1970 | Milazzo | 198/747 X |
| 3,512,337 | 5/1970 | Fitch | 198/739 X |
| 3,527,087 | 9/1970 | Converse, III et al. | 198/345 X |
| 3,570,656 | 3/1971 | Manetta | 198/744 X |
| 3,796,300 | 3/1974 | Hudson | 198/745 |
| 4,215,521 | 8/1980 | Hartness | 53/248 |

FOREIGN PATENT DOCUMENTS 0501946 2/1976 U.S.S.R. .............................. 198/743

Primary Examiner—Joseph E. Valenza
Assistant Examiner—Lyle Kim
Attorney, Agent, or Firm—Dority & Manning

[57] ABSTRACT

A rake conveyor (A) for incrementally advancing containers on an article loading machine is disclosed which includes a linkage assembly (34) having a pair of generally parallel linkage bars (36,38) between which a plurality of pivotal dogs (C, 44, 44a) are carried. An air cylinder (58) actuates the rake linkage assembly (36, 38) by a connector (66) connecting the piston rod (60) of the air cylinder to the linkage bars (36, 38). The linkage bar (38) moves relative to the bar (36) at the onset of the forward stroke of the rake to cause the dogs (44) to pivot outward to a container engaging position prior to their forward movement. Motion limiting elements (80, 82) limit the pivoting movement of dogs (44) on the return stroke to a linear movement. Positioning elements (E) are provided in the form of positioning blocks (90, 92, 94, 98) which stop the containers at selected positions along the conveyor as is necessary for processing and loading the containers. Advancement by the rake conveyor (A) imparts a sufficient force to the containers that the positioning blocks are pivoted to a release position allowing advancement of the containers past the positioning blocks on the forward advance stroke of the rake conveyor.

24 Claims, 12 Drawing Figures

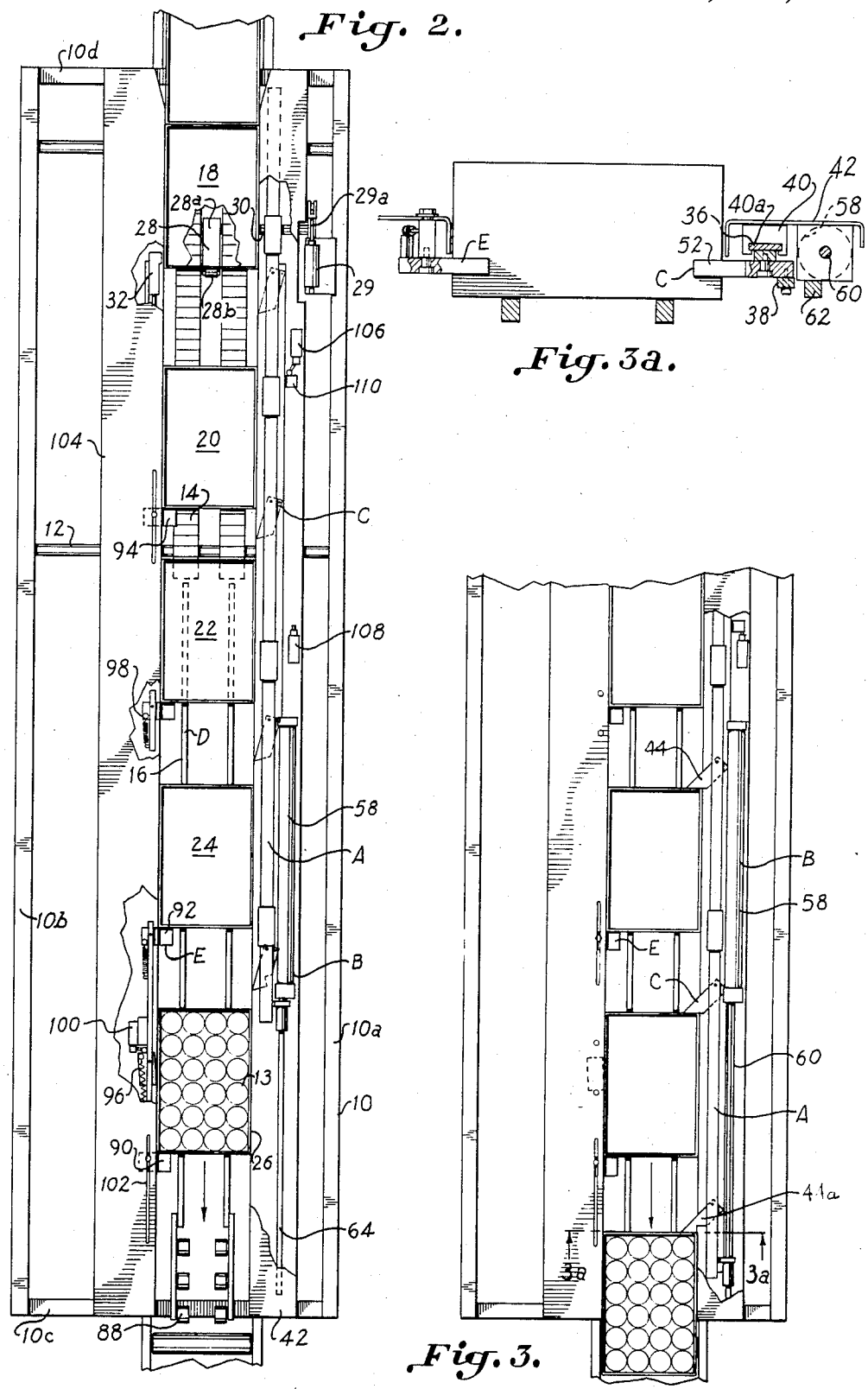

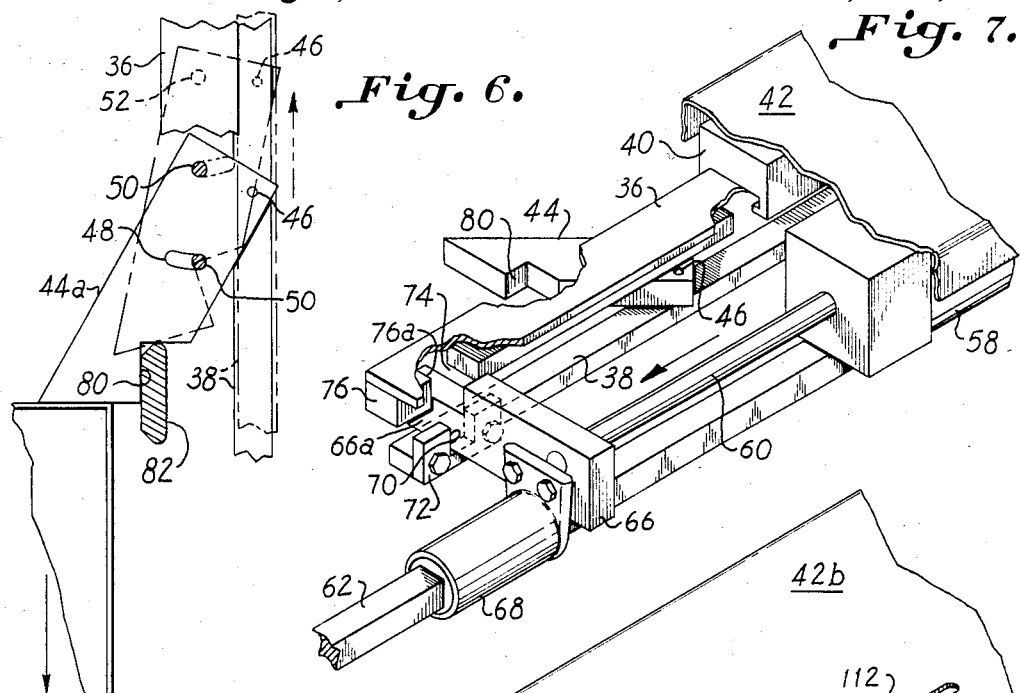
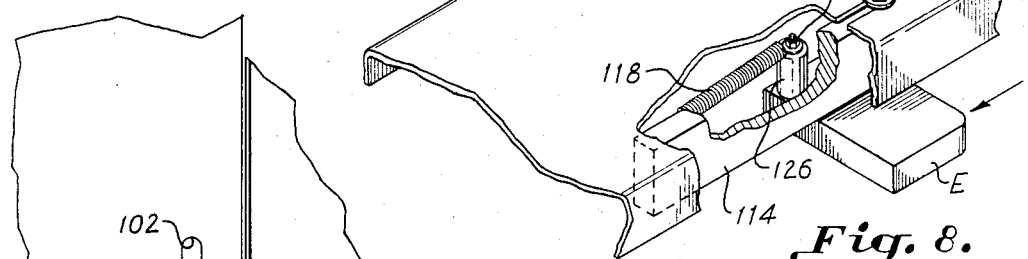
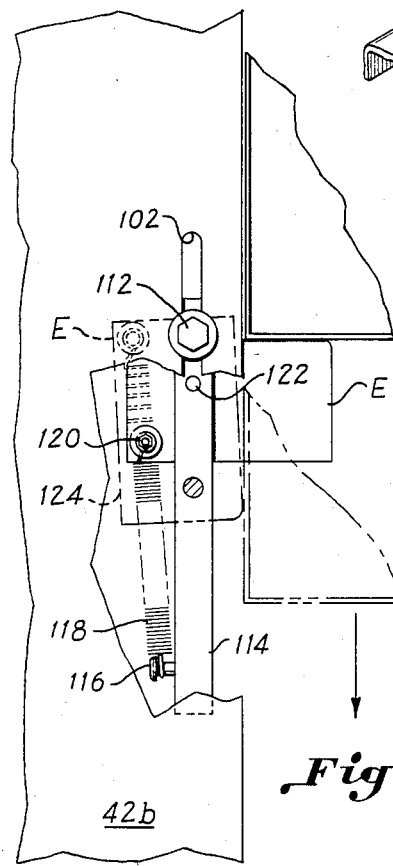
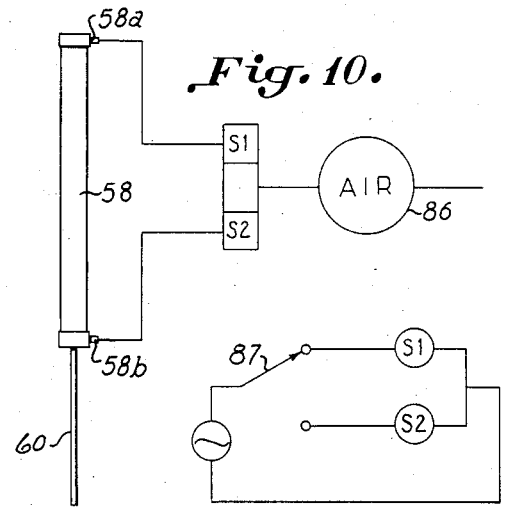

RAKE CONVEYOR APPARATUS

BACKGROUND OF THE INVENTION

The invention relates to apparatus for conveying packaging containers in which articles are loaded on an article loading machine, for example, a typical bottle packing machine and conveyor utilized in the bottling industry.

Heretofore, containers such as cardboard boxes, wood and plastic bottle crates, and the like have been conveyed on an article loading machine by means of a chain conveyor which includes chain lugs which catch the container and convey it continuously on the moving chain conveyor. The lugs must be equally spaced around the conveyor chains in an endless arrangement limiting the number of containers which can be handled by the conveyor. When the lugs and chain wear, their reliability in engaging the containers and positioning them reliably on the machine for article loading becomes a problem. Flat belts or chains with other assorted devices to separate and position cases have also been used to convey cases or boxes.

The chain type conveyor also requires the use of large clutch and brake units to drive and stop the conveyor. Due to the inertial force of the clutch, it is hard to stop when a box or crate becomes hung up on the conveyor resulting in the conveyor being being overdriven and destruction of the box or jamming of the conveyor. As the clutch and brake wear, the position of the lugs change during conveyor operation resulting in unreliable container positioning. In the environment in which bottle loading machines operate, the clutch and brake units are susceptible to getting wet or contaminated by food products or dust from boxes or a combination of the above. The contaminated or wet clutch brake units slip resulting in lack of control over the container position when stopped during conveyor operation. The lug and container are out of position causing malfunctioning of the bottle drop or other operation attendant to the loading process.

Prior chain conveyor type apparatus for packing machines are shown in U.S. Pat. Nos. 2,713,448 and 4,302,919. Endless belt type conveyors for article loading machines are shown in U.S. Pat. Nos. 3,593,489 and 3,694,992.

Accordingly, an important object of the present invention is to provide a conveyor for use on an article loading machine which does not use a clutch and brake arrangement of the chain type conveyor and is simplified resulting in less wear and more reliable operation.

Still another important object of the present invention is to provide a conveyor which will convey packaging containers along an inclined surface and will not cause container damage upon jamming.

Another important object of the present invention is to provide a rake assembly which may be carried along a conveyor platform to advance containers on the conveyor platform incrementally to selected positions along the conveyor path.

Still another important object of the present invention is to provide conveyor apparatus which conveys containers incrementally along a stationary conveyor platform and which stops the containers and positively positions them at the end of their incremental advancement to provide reliable positioning of the containers at the selection operation positions along the conveyor path.

Still another important object of the present invention is to provide an incremental conveyor which utilizes a reciprocating rake having dogs which positively engage containers to advance them incrementally along a stationary conveyor platform.

Still another important object of the present invention is to provide apparatus to keep open flaps on containers from interfering with each other on a conveyor by positive separation of the containers during conveyance.

SUMMARY OF THE INVENTION

The above objectives are accomplished according to the present invention by providing a rake conveyor which includes a plurality of dogs which catch the containers and advance them incrementally along a stationary conveyor platform. The apparatus includes a frame for supporting the conveyor above a surface of the floor and a conveyor platform carried by the frame which establishes a conveyor path. A reciprocating elongated rake is carried by the frame adjacent the conveyor platform. A plurality of pivotable rake dogs are carried by the rake at spaced locations along the length of the rake. There is an actuator for reciprocating the rake in a forward stroke and a return stroke. The pivotable dogs swing outwardly to a container engagement position on the forward stroke of the rake and retract to a non-engaging position on the return stroke. Positioning blocks are located along the conveyor path adjacent the end of the forward stroke of the rake to stop and positively position the containers at the end of the forward stroke of the rake. More or less dogs may be attached to provide for longer or shorter containers and to move containers over a longer distance. In this manner, the containers are conveyed and positioned incrementally along the conveyor path. At any selected position, the container is reliably positioned so that operation may be carried out. For example, at an article loading position, the container is positively stopped and positioned by a positioning block so that articles may be loaded into the container. After filling of the container with articles, the rake conveyor engages the container and conveys it past the positioning block which yields to the force of the conveyor.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a top plan view of the rake conveyor apparatus according to the invention with parts cut away and the rake conveyor in a return position;

FIG. 3 is a top plan view illustrating an article loading machine having a rake conveyor according to the present invention with the rake conveyor in a forward advance position;

FIG. 3a is a sectional view taken along line 3a—3a of FIG. 3;

FIG. 6 is a partial top plan view with parts cut-away illustrating a pivoting rake dog for a rake conveyor constructed according to the present invention;

FIG. 7 is a perspective view with parts cut-away illustrating an actuator for a rake conveyor constructed according to the present invention;

FIG. 8 is a perspective view with parts cut-away illustrating a positioning block for stopping and positively positioning containers incrementally advanced on a conveyor according to the present invention;

FIG. 9 is a partial top plan view with parts cut-away illustrating a positioning block for stopping and positioning a container incrementally advanced on a conveyor constructed according to the present invention; and FIGS. 10 and 11 are schematic views illustrating a circuit for actuating a rake conveyor constructed according to the present invention.

DESCRIPTION OF A PREFERRED EMBODIMENT

Figure 1:
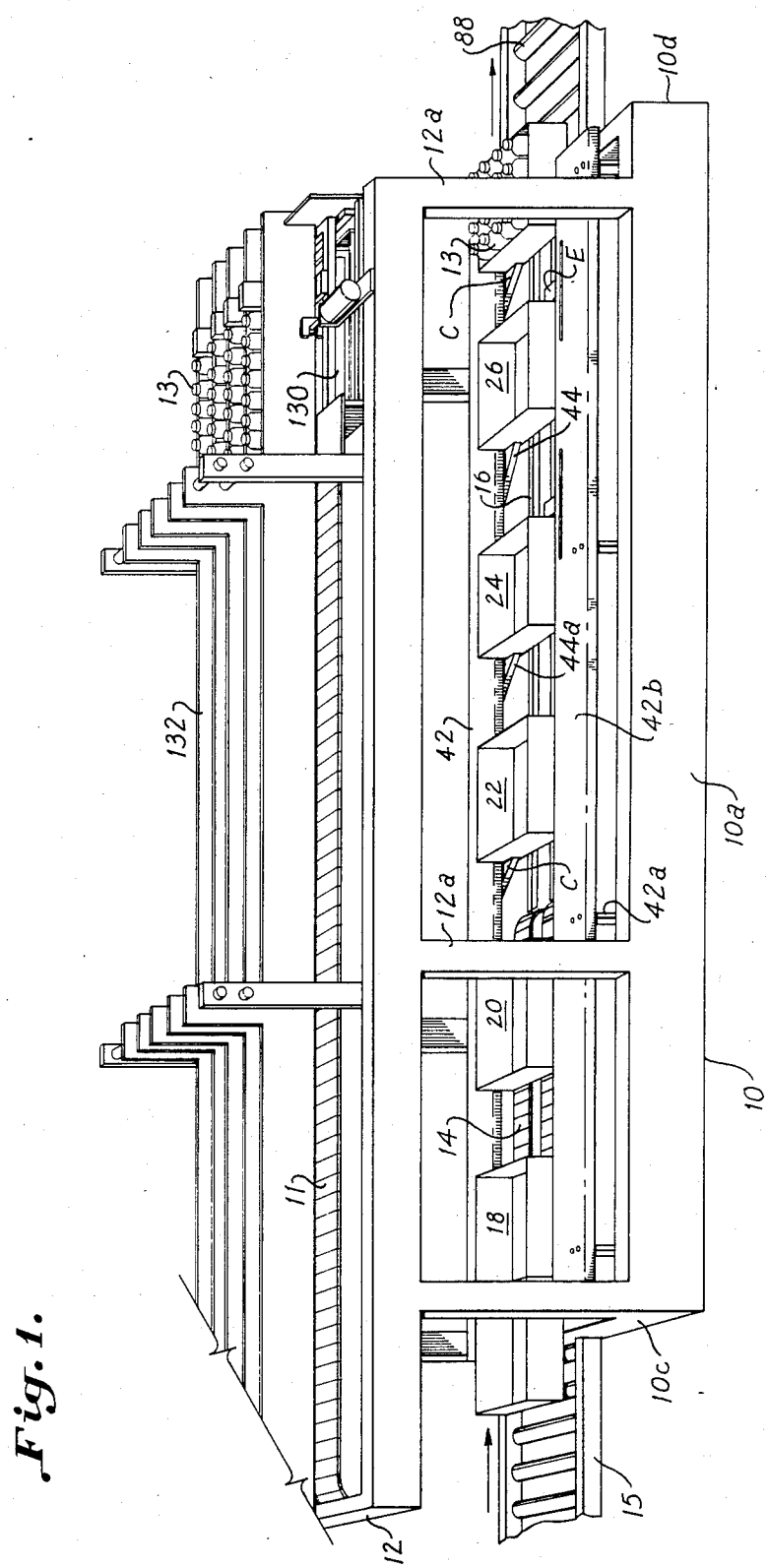
FIG. 1 is a perspective view illustrating an article loading machine having a rake conveyor apparatus for conveying and positioning containers on the machine according to the invention.
Figure 4:
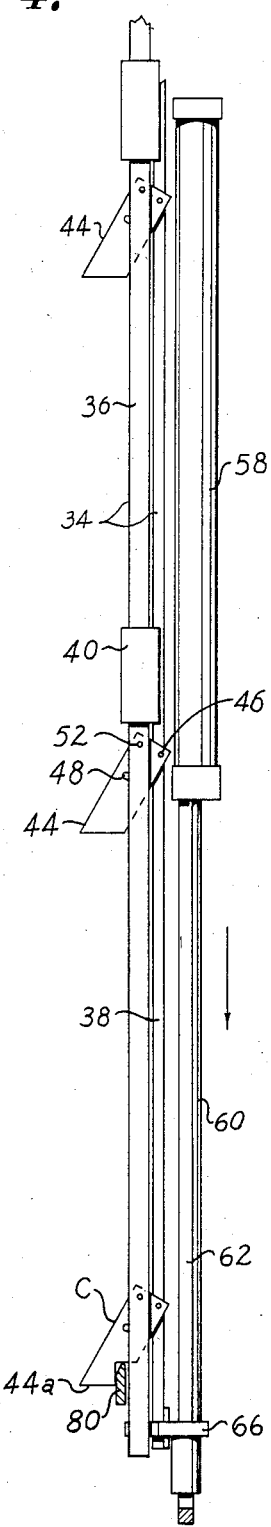
FIG. 4 is a top plan view of a reciprocating rake assembly for conveyor constructed according to the present invention.
Figure 5:
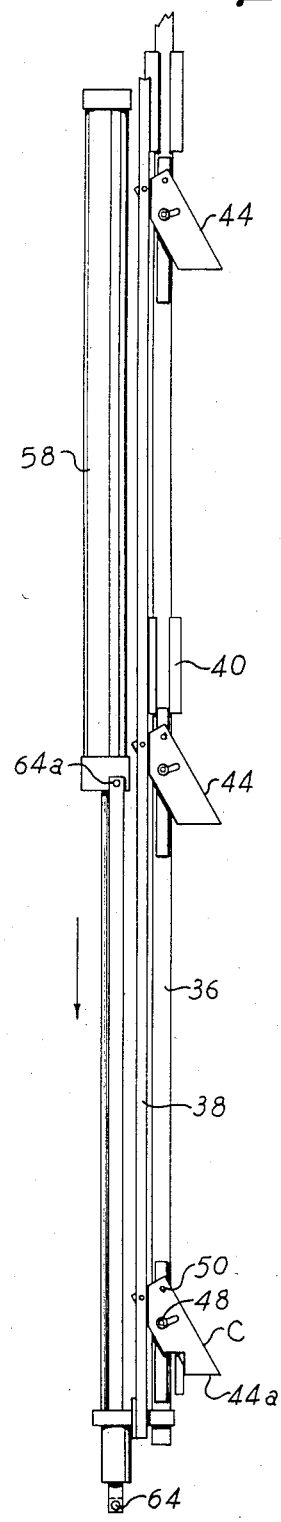
FIG. 5 is a bottom plan view of the rake assembly constructed according to the present invention.

Referring now to the drawings, a rake conveyor is illustrated for use on an article loading machine for loading articles into containers, for example, a case packer for soft drink bottles. The conveyor includes a frame means for supporting the apparatus above a floor surface. A conveyor platform means is carried by the frame means on which the containers are supported for conveyance along a conveyor path. A reciprocating elongated rake means A is carried by the frame means adjacent the conveyor platform means. The elongated rake means has a forward stroke for incrementally advancing the containers along the conveyor path and a return stroke which returns the elongated rake means without container engagement. Actuation means B is provided for reciprocating the rake. Pivoting rake dog means C is carried by rake means A which pivot between a container engaging position and a retracted non-engaging position. On the advance stroke of the rake means A the dog means C pivots outwardly to engage a container on the conveyor platform which is stationary. On the return stroke of the rake means, the dog means C are pivoted and retracted inwardly to disengage from the containers. By reciprocating the rake A, the containers are then advanced incrementally along the conveyor.

Referring now in more detail to the drawings, the frame means includes a rectangular frame 10 having side frames 10a, 10b, and end frames 10c, 10d. A plurality of cross frames 12 extend between the side frames. Upper frame 12 supported on vertical legs 12a supports an article conveyor 11 which feeds in articles 13 to be loaded into containers conveyed and positioned below on frame 10.

Conveyor platform means for supporting conveyed containers includes an endless travelling belt conveyor having a pair of belts 14 at the entrance end of the conveyor and a stationary platform comprising a pair of runners 16. At the entrance end of the conveyor, containers, such as containers 18, 20, 22, 24, and 26, are conveyed and led onto the travelling belts 14 from a delivery rack 15.

An indexing device 28 is carried at the entrance end which includes a pivoting lever 28a between the belts 14. Carried on the end of lever 28 is a roller stop 28b which pivots up into the path of the containers coming onto the conveyor. The roller stop of the indexing device catches and holds the container at the front, as can best be seen in FIG. 2, and releases the container only when it has received proper signals that the conveyor is ready for another container. A sensor 32 senses a container present at the indexing device. A hydraulic cylinder 29 which may be actuated by an electrical signal from any suitable control system (not shown) pivots the arm 28a downwardly to release a container at the proper time. Suitable linkage assembly 29a connects the actuator 29 to a shaft 30 on which lever 28a is affixed for pivoting.

Elongated reciprocating rake means A carried alongside the conveyor path includes an elongated linkage assembly which reciprocates and carries the pivoting dog means C. The linkage assembly includes a first linkage bar 36 which is slidably carried by the frame of the conveyor and a second linkage bar 38 which is generally parallel with the first linkage bar. Bars 36, 38 reciprocate but move relative to one another at the onset of reciprocation to cause dog means C to pivot outwardly before moving forwardly.

Slide blocks 40 are affixed to a top frame plate 42 and include a C-shaped channel 40a, as can best be seen in FIG. 3a, which slidably receives the linkage bar 36. The plate 42 is, in turn, fastened to the frame 10 at spaced locations by means of upstanding legs 42a. Thus, the plate 42 is fixed to the frame, the linkage bar 36 is slidably carried by the plate 42 and the entire reciprocating conveyor rake is slidably suspended from the plate 42 alongside the stationary conveyor platform.

Dog means C includes a plurality of pivoting dogs 44. The linkage bar 38 includes a pivot pin 46 about which a dog 44 pivots. There is an arcuate slot 48 formed in each dog 44. There are a number of guide pins 50 carried by the linkage bar 36 which are received in the slots 48 of the dogs 44. A second number of pivot pins 52 is carried by the bar 36 pivotably connected to each dog 44. By this means, the individual dogs 44 of the dog means C are pivotably carried and guided by the linkage bar assembly 36, 38. The pins 50, 52 carried by bar 36 are affixed in a block 76 integral with the bar which is described below.

Actuation means for actuating and reciprocating the linkage bar assembly 36, 38 includes an air cylinder 58 having a reciprocating piston rod 60 which is guided by means of a guide bar 62 which has one end 64 affixed to the frame 10. Air cylinder 58 is affixed to the underneath side of frame plate 42 as are slide blocks 40.

Affixed to the end of the piston rod 60 is an engagement connector member 66. A sleeve 68 which slides over the guide bar 62 is affixed to the connector 66 so that the piston rod is guided and supported during reciprocation. The engagement connector means 66 engages and connects the piston rod with the reciprocating linkage bar assembly 36, 38. As can best be seen in FIG. 7, the connector includes a nose portion 66a which fits in a one-to-one fit within a slot 70 formed in a connecting plate 72 affixed to the linkage bar 38. The nose 66a of the connector 66 also is fitted in a wider slot 74 formed in a connecting block 76 fixed to the linkage bar 36. In this manner, upon the forward stroke of the piston, the connector 66 moves the linkage bar 38 one-to-one while moving the linkage bar 36 only after the free space in the slot 74 has been overcome whereupon the engagement end 76a of the engagement block 76 is engaged. This action causes the pivoting dogs 44 to swing outwardly to a container engaging position prior to the linkage assembly and rake dogs being advanced forwardly on the advance stroke of the rake. The dogs 44 will swing outwardly to a full container engaging position prior to advancing forwardly.

One of the dogs 44a includes a notched out engaging surface 80. Motion limiting means for limiting the motion of the dogs C on the return stroke of the rake is provided in order that there be no forward movement of the dogs, but that they move generally in linear motion on the return stroke at the initiation of motion. As can best be seen in FIG. 6, the solid line position of the dog is at the end of the advancement stroke wherein the notched engagement surface 80 engages a limiting member in the form of an upstanding standard 82 carried by the frame of the conveyor. Upon initiation of the rearward return stroke, engagement between the surfaces 80 and 82 prevents the dog 44a and hence the remaining dogs 44, which are interconnected by means of the linkage assembly, from pivoting. As the return stroke begins, the surface 80 will move in a line past the limiting member 82 until it has cleared the member at which time it will be allowed to pivot inwardly and retract to its non-engaging position. If the dogs were not so limited, then there would be some forward component of movement of the dogs at the onset of the return stroke as they pivot under their normal action. This forward thrust would disturb the positioning of the containers as has been accomplished by the rake conveyor on its forward stroke.

As can best be seen in FIGS. 2 and 3, there are four dogs 44 on the rake conveyor A. Thus, the rake conveyor handles and advances four containers at a time on the conveyor path. Additional dogs may be attached so as to move as many containers as desired. In FIG. 2, the containers 20, 22, 24 and 26 are illustrated with the rake conveyor in its return position. Upon actuation of the rake conveyor by means of the air cylinder B the four containers will be advanced incrementally along the conveyor platform which includes the moving conveyor 14 and the stationary platform.

FIGS. 10 and 11 illustrate suitable conventional circuitry for controlling air cylinder 58 which has a double-action piston and two inlets 58a, 58b. Switches S1, S2 connect inlets 58a, 58b, respectively, to a compressed air source 86. Switches S1, S2 may be solenoid switches controlled by the machine control circuit which switches at 87 to either solenoid as conveyor operation is synchronized with the other operations, i.e. container infeed, bottle loading, etc. Air pressure is regulated to push the containers past the position blocks on each subsequent advance stroke yet not cause excessive damage should a box hang up. In this case, the air pressure will only suffice to stall the air cylinder and not force the box further.

At the end of the advancement stroke of the rake conveyor, positioning means E are provided to stop and position the containers at selected positions along the length of the conveyor at which operations may occur. For example, referring to FIG. 2, container 26 is in an article loading machine and has had bottle articles 13 loaded therein. Upon actuation of the rake conveyor, the container 26 will be pushed off of the article loading position onto an outlet conveyor in the form of a roller rack conveyor 88.

The positioning means E described above includes a plurality of positioning blocks 90, 92, 94 and 98. The positioning blocks hold the containers separated and in a position so that they will be picked up by the rake on the advance stroke. Without positive stoppage, the containers would drift under their momentum from advancement of the previous advance stroke. This drifting would cause the containers to be out of position and the side of the containers would be jammed by a dog on the next stroke. The blocks position the containers where the butt of the box will be struck by the dog.

There is an additional block 96 which is used as a sensing member. Block 96 senses the presence of a case in the packaging position to effect dropping and loading of the articles into the container.

The block 94 stops the container, such as 20, on the moving conveyor 14 and holds the container in a rake pickup position for pickup by the rake conveyor on its forward stroke. Block 92 stops and positions a container firmly in position for a secondary operation as, for example, a flap opening station where container flaps are opened. Positioning block 90 stops the container, such as 26, positively in the packaging position so that it will be in alignment for the loading of bottles or other like articles. A switch 100 is shown which is actuated by the sensing block 96 as part of a conventional control circuit (not shown) for loading the articles in the containers.

So that different size containers may be accommodated on the conveyor and article loading machine, the positioning blocks 90 and 92 are made adjustable by means securing them in slots 102 formed in a top frame member 42b which is affixed to the frame 10 by upstanding legs attached to the top plate 42b and the frame 10. The butt of the box is the reference edge and the blocks are adjusted until the butt is positioned where desired. Blocks 94 and 98 may be non-adjustable or adjustable.

Means for fixing the positioning block in the positioning slots 102 may be provided in the form of a nut and washer 112 which threads into a lock plate 114 which includes at one end a pin 116 about which a spring 118 is affixed which provides a biasing means. The other end of the spring is affixed to the positioning block by means of a screw 120. The block is pivotably connected to the plate 114 at 122. To be forced to a release position as shown in dotted lines in FIG. 9 at 124, the spring is placed in tension. Normally, the force of the container coming to a stop after being advanced by the rake conveyor A is not sufficient to overcome the biasing of spring 118 and thus the blocks E positively stop and position the containers. However, under the force of the advance stroke of the rake conveyor, the containers push on the blocks E and overcome the spring 118 and convey the containers onto the next position incrementally. The block is held in its blocking position, as can best be seen in FIG. 8; by means of abutment post 126 which receives the threaded fastener 120 securing the spring 118 to the positioning block.

Switch means for sensing the position of the rake assembly A is provided by a return sensing switch to sense the rake in its return position at 106 and a forward position switch 108 which senses the advancement of the rake. Both switches are actuated by an abutment 110 carried on the linkage bar 36.

In the article loading position, as is container 26 illustrated in FIG. 2, bottles 13 will be loaded through an elevator grid set 130. Bottles 13 are separated in lanes 132 and conveyed to the grid set 130 in a conventional manner. Grid set 130 may be any suitable elevator grid set such as that shown in U.S. Pat. No. 4,215,521 which holds and lowers the bottles into containers 26 whereupon the bottles are released.

The opposing inside edges of top frame plates 42 and 42b define a guide channel through which the boxes slide and are conveyed.

It will be understood, of course, that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

What is claimed is:

1. A rake conveyor apparatus for conveying containers and the like on a container packing machine, said apparatus comprising:
    frame means for supporting said apparatus above a surface of a floor;
    a conveyor platform carried by said frame means on which said containers are supported for conveyance along a conveyor path;
    reciprocating elongated rake means carried by said frame means adjacent said conveyor platform;
    said elongated rake means having a forward stroke for advancing said containers along said conveyor path and a return stroke which returns said elongated rake means without container engagement;
    actuation means for reciprocating said rake means in a reciprocating motion between a forward and return position;
    spaced movable rake dog means carried by said rake means at spaced locations along the length of said rake means and mounted for pivotal movement relative to said rake means between a non-engaging container position and a container engaging position for engaging said containers;
    said rake dog means moving to a container engagement position upon said forward stroke of said rake means to engage said containers and advance said containers incrementally to selected positions along said conveyor path;
    motion limiting means contacting said rake dog means as said rake dog means moves between said engaging position and said non-engaging position for initially limiting to linear motion the movement of said rake dog means during the return stroke while said rake dog means contacts said motion limiting means.

2. The apparatus of claim 1 wherein said reciprocating rake means includes a reciprocating elongated linkage means carried adjacent said conveyor platform on which said pivoting dog means are pivotably carried.

3. The apparatus of claim 2 wherein said actuation means includes a power operated rod connected to said reciprocating elongated linkage means.

4. The apparatus of claim 2 wherein said elongated reciprocating linkage means includes first and second linkage bars, said pivoting dog means being carried and pivotably guided between said first and second linkage bars so that movement of said linkage means causes said dog means to pivot.

5. The apparatus of claim 3 wherein said power operated rod includes a fluid operated piston which reciprocates from a forward position to a return position.

6. The apparatus of claim 4 wherein said elongated reciprocating linkage means includes first a second linkage bars which are relatively movable with respect to one another;
    said dog means being connected and pivotally guided by said linkage bars; and
    said actuation means engaging a first of said linkage bars prior to engagement of said second linkage bar at the onset of said forward stroke of said rake means causing said dog means to pivot toward said engagement position prior to moving forward.

7. The apparatus of claim 4 wherein said actuation means includes:
    a reciprocating power operated rod carried by said frame;
    engagement connecting means interconnecting said reciprocating power operated rod and said elongated linkage means;
    said engagement connecting means including a connector fitted with said first linkage bar to move said first linkage bar in a one-to-one relation, said connector being fitted with said second linkage bar for free movement without engagement of said second linkage bar for a predetermined distance so that said first linkage bar is moved by said connector before said second linkage is engaged and moved by said connector.

8. The apparatus of claim 1 including:
    an elongated reciprocating linkage assembly included in said rake means which includes a first and second elongated linkage bar carried for reciprocating movement by said frame means;
    said rake dog means being carried and pivotably guided by said linkage assembly; and
    said actuation means engaging said linkage assembly on the forward stroke of said rake means to pivot said rake dog means outwardly toward said engagement position prior to moving said rake dog means forwardly to advance said containers.

9. The apparatus of claim 8 including:
    said rake dog means including a plurality of rake dogs carried along a length of said linkage assembly for engaging said containers at said selected positions;
    said motion limiting means limiting the pivotal movement of said rake dogs on said return stroke of said reciprocating motion of said elongated linkage assembly limiting forward motion during pivoting of said rake dogs on said return stroke to their non-engaging position so that the containers are not disturbed in their positions.

10. The apparatus of claim 9 wherein said motion limiting means includes:
    a limit member carried by said frame means adjacent said reciprocating linkage assembly;
    a limit surface formed on at least one of said dogs;
    said limit surface engaging said limit member upon movement of said one dog on the forward stroke of said reciprocating linkage assembly;
    said limit member engaging said limit surface to limit the movement of said one dog to generally rectilinear motion on the return stroke of said reciprocating linkage assembly while said limit surface of said one dog is in contact with said limit member; and
    said dogs being interconnected by said linkage assembly so that all of said dogs follow and are limited to the rectilinear movement of said one dog on said return stroke.

11. The apparatus of claim 10 wherein said limit surface includes a notch formed in a container engaging surface of said one dog.

12. The apparatus of claim 1 including:
positioning means for positioning said containers at said selected positions along the length of said conveyor path.

13. The apparatus of claim 12 wherein said positioning means includes:
spaced positioning block means carried adjacent said conveyor path;
said positioning block means having a blocking position for stopping and positioning said containers on said conveyor platform and a release position for allowing said containers to be conveyed past said positioning block means; and
means for moving said positioning block means between said blocking and release positions.

14. The apparatus of claim 13 wherein said positioning block means are biased into said blocking position by biasing means; and
said containers engaging and moving said positioning block means to said release position overcoming said biasing means upon advancement by said rake means to move thereby.

15. The apparatus of claim 13 including a package-loading positioning block means for positioning said containers in a package loading position; and
said package-loading positioning means being adjustably carried on said frame so that the position of said containers in said loading position may be varied to accommodate different size containers.

16. The apparatus of claim 1 including switch means for detecting the forward and return positions of said reciprocating rake means.

17. A rake conveyor apparatus for incrementally conveying containers and the like on a packaging machine, said apparatus comprising:
frame means for supporting said apparatus above a surface of a floor;
conveyor platform means carried by said frame means on which said containers are supported for conveyance along a conveyor path;
reciprocating elongated rake means carried by said frame means adjacent said conveyor platform;
actuation means for reciprocating said rake means in a reciprocating motion between a forward and a return position;
spaced pivotable rake dog means pivotably carried by said rake means at spaced locations along the length of said rake means having a non-engaging container position and a container engaging position for engaging said containers;
said rake dog means pivoting to said container engagement position on the forward stroke of said rake means to engage said containers and advance them incrementally along said conveyor path;
motion limiting means contacting said rake dog means as said rake dog means moves between said engagement position and said non-engagement position for initially limiting to linear motion the movement of said rake dog means during the return stroke while said rake dog means contacts said motion limiting means; and
positioning means for stopping said containers along said conveyor path upon advancement by said rake means and positioning said containers at selected positions along the length of said conveyor.

18. The apparatus of claim 17 wherein said position means includes:
a plurality of positioning blocks carried along the length of said conveyor path by said frame means;
said positioning blocks having a blocking position for stopping and positioning said containers along said conveyor path and a release position in which said containers are allowed to flow past said positioning blocks along said conveyor path; and
means for moving said positioning blocks between said blocking and release positions.

19. The apparatus of claim 17 wherein said positioning means includes:
a plurality of positioning blocks carried by said frame means along said conveyor path;
said positioning blocks having a blocking position which generally stops the conveyance of said containers therepast and a release position in which said containers are allowed to be delivered past said positioning blocks along said conveyor path;
biasing means for biasing said positioning blocks in said blocking position;
said biasing means being overcome by said containers engaging said positioning blocks when being advanced by said rake means during the forward stroke of said reciprocating rake means.

20. The apparatus of claim 19 wherein said positioning means includes a package loading positioning block carried adjacent an end of said frame for positioning said container underneath packages to be loaded in said container.

21. Apparatus for conveying packaging containers in discrete increments on an article loading machine comprising:
frame means;
conveyor platform means carried by said frame means establishing a conveyor path along which said containers are conveyed;
non-continuous conveyor means carried by said frame means adjacent said conveyor platform means for incrementally advancing said containers to a selected position along said conveyor path in a non-continuous manner, said non-continuous conveyor means including:
an elongated reciprocating rake assembly;
a plurality of pivotal rake dogs carried by said elongated rake assembly, said rake dogs being pivotably carried by said rake assembly so that said rake dogs pivot outwardly toward an engagement position with said containers prior to being advanced forward on said forward stroke of said elongated rake means;
said rake assembly reciprocating in a forward stroke in which said rake dogs engage and advance said containers incrementally and a return stroke in which said rake dogs are retracted out of engagement with said containers;
means for actuating said reciprocating rake means in said forward and return strokes, including connecting means connecting said actuation means and said elongated rake assembly;
limit means for limiting the movement of said rake dogs to generally linear motion during a portion of the return stroke of said elongated rake assembly, preventing any forward movement of said rake dogs as normally accompanied by the pivoting of said rake dogs so that the selected positions of said containers are not disturbed;

positioning means carried adjacent said platform means along said adjacent conveyor path for positively stopping and positioning said containers at said selected position upon incremental advancement of said containers by said conveyor means corresponding to said discrete increment of advancement, said positioning means including:

positioning blocks carried at spaced positions along the length of said conveyor platform means corresponding to a number of selected positions;

said positioning blocks being biased towards said containers coming downstream along said conveyor path; and said containers overcoming the biasing of said blocks to pass thereby upon advancement of said containers by said incremental advancement.

22. The apparatus of claim 21, wherein said conveyor platform means includes a stationary conveyor platform fixed with respect to said frame means.

23. The apparatus of claim 21 wherein said positioning means includes spaced positioning blocks spaced along the length of said conveyor platform means located adjacent the end of said forward stroke of said conveyor means.

24. The apparatus of claim 21 including top frame members carried on opposing sides of said conveyor platform means defining a guide channel in which said containers slide during conveyance.

* * * * *